(12) United States Patent
Markham

(10) Patent No.: US 6,499,435 B2
(45) Date of Patent: Dec. 31, 2002

(54) PORTABLE CORRAL

(76) Inventor: Donald A. Markham, 809 Sumac Dr., Streamwood, IL (US) 60107

( * ) Notice: Subject to any disclaimer, the term of this patent is extended or adjusted under 35 U.S.C. 154(b) by 0 days.

(21) Appl. No.: 09/836,030

(22) Filed: Apr. 17, 2001

(65) Prior Publication Data

US 2002/0148411 A1 Oct. 17, 2002

(51) Int. Cl.⁷ ................................................ A01K 3/00
(52) U.S. Cl. .................................................... 119/512
(58) Field of Search ............................ 119/512, 20, 82, 119/155; 256/24, 65, 25, 26, 32, 33; 280/30

(56) References Cited

U.S. PATENT DOCUMENTS

| | | | |
|---|---|---|---|
| 3,135,267 A | * | 6/1964 | Liebig .......................... 119/512 |
| 3,336,908 A | * | 8/1967 | Swanson ....................... 119/512 |
| 3,614,068 A | * | 10/1971 | Koehl ............................ 256/19 |
| 3,724,424 A | * | 4/1973 | Benjamin ...................... 119/498 |
| 3,726,256 A | | 4/1973 | Bernhardt et al. |
| 3,741,529 A | | 6/1973 | Blagg |
| 3,744,456 A | | 7/1973 | Wheeler et al. |
| 3,815,877 A | | 6/1974 | Turner |
| 3,921,585 A | | 11/1975 | Hall |
| 3,970,045 A | | 7/1976 | Graham, Jr. |
| 4,055,148 A | | 10/1977 | Brockman et al. |
| 4,067,547 A | | 1/1978 | Peters |
| 4,090,472 A | | 5/1978 | York |
| 4,208,037 A | * | 6/1980 | Le Gal ........................ 119/514 |
| 4,432,305 A | | 2/1984 | Vernese |
| 4,465,262 A | * | 8/1984 | Itri et al. ..................... 160/374 |
| 4,537,151 A | | 8/1985 | Bolton |
| 4,844,424 A | | 7/1989 | Knudslien |
| 4,924,813 A | | 5/1990 | Bixler et al. |
| 5,063,876 A | | 11/1991 | Harris |
| 5,081,723 A | * | 1/1992 | Saunders ........................ 5/100 |
| 5,201,426 A | | 4/1993 | Cruwell, Jr. |
| 5,354,036 A | * | 10/1994 | Brown .......................... 256/25 |
| 5,454,662 A | | 10/1995 | Skibitzke et al. |
| 5,564,367 A | | 10/1996 | Boyanton |
| 5,899,171 A | | 5/1999 | Abrahamson |
| 6,067,940 A | | 5/2000 | Holder |
| 6,073,587 A | | 6/2000 | Hill et al. |

* cited by examiner

Primary Examiner—Robert P. Swiatek
Assistant Examiner—Bethany L Griles
(74) Attorney, Agent, or Firm—Mathew Perrone, Jr.

(57) ABSTRACT

The portable corral has a series of fence sections. Each fence section is preferably formed by a telescoping panel, which has a first female panel and a second male panel, which telescope into or out of each other, thereby permitting the length thereof to be adjusted. The slidable or telescoping panels have base receivers to support the panels or the fence sections as desired. Fasteners also join adjacent sections together, in order to form the corral into its desired shape.

18 Claims, 5 Drawing Sheets

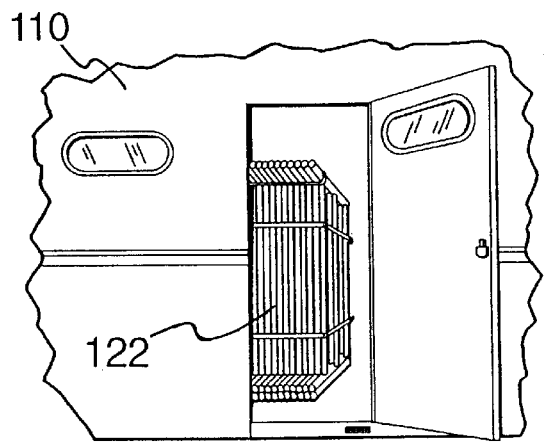
Fig.6.
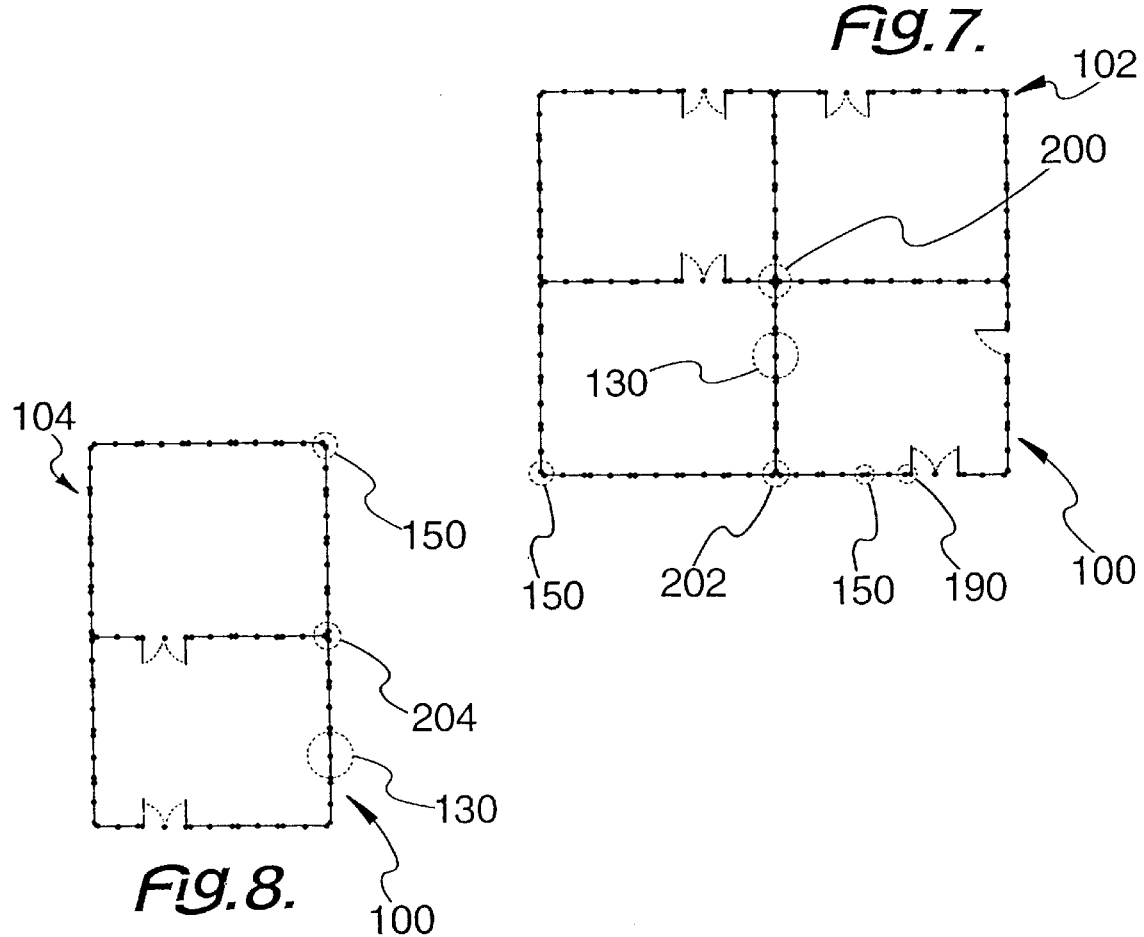
Fig.7.
Fig.8.

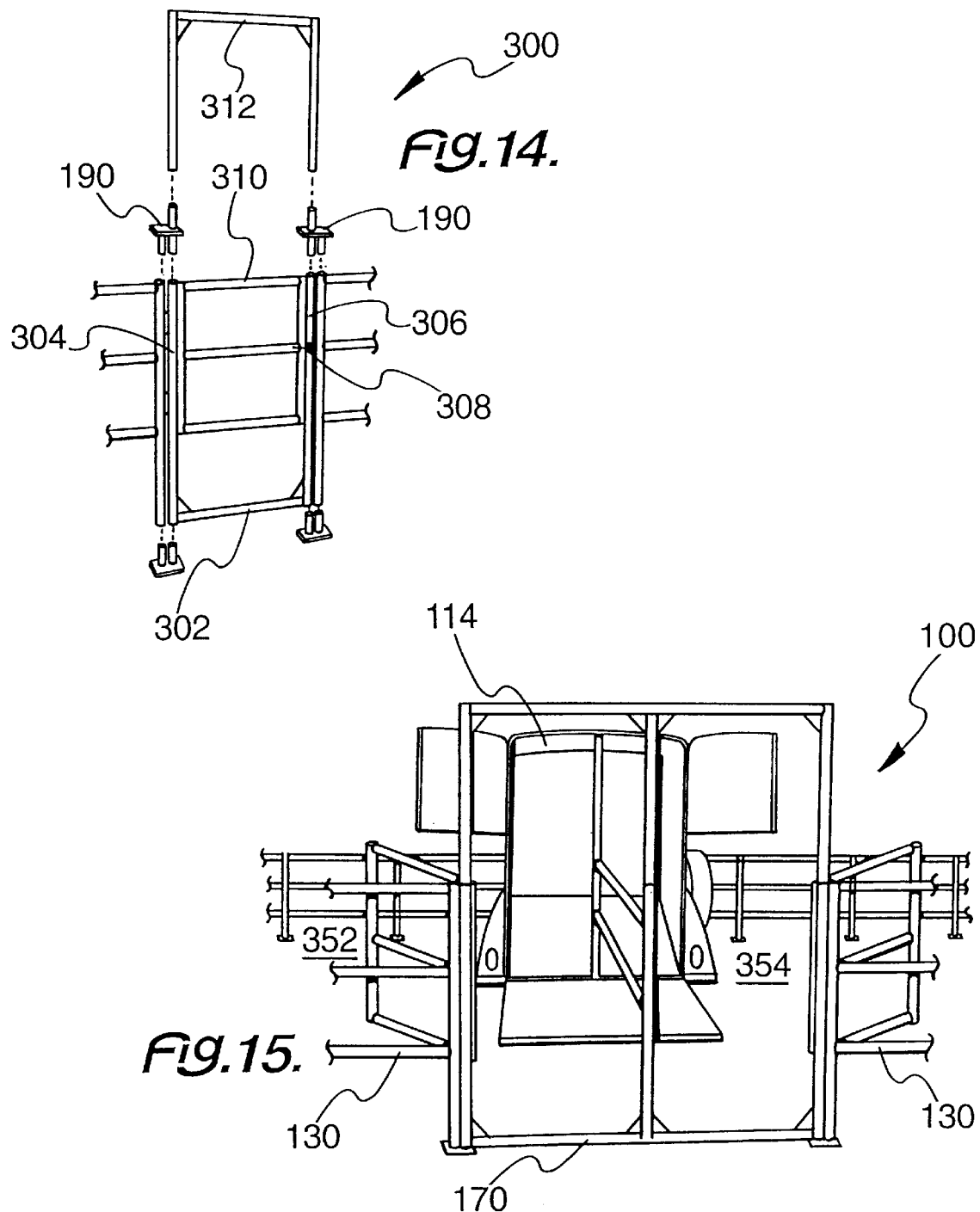

PORTABLE CORRAL

This invention relates to a portable corral, and more particularly to a portable corral, which can be collapsed when desired and easily set up in a desired configuration.

BACKGROUND OF THE INVENTION

With horses, transportation is necessary. The horses must be transported to races, exhibits, or other events. Usually, the horses are transported in a trailer. However, upon arrival at the site of an event, the owner must obtain shelter for both humans and horses.

This is a difficult procedure. Such events are very crowded and arrangements for owners and horses are difficult to find. When the horses are transported to an unknown place, it is critical to permit the horse to exercise. However, it is necessary to prevent the animal from running away.

Conventional fence assemblies are generally time consuming and tedious. Such fence assemblies are difficult to erect and require considerable handling. Furthermore, the fence sections sometimes lack the height necessary to contain a particular animal.

Sometimes it is also desirable to divide a portable structure into one or more chambers or corrals. This is difficult to achieve. The different structures require different features in storing and carrying. Thus, the required features to achieve the desired result cannot always be accomplished.

It is also necessary to brace the corral and have it stand in an appropriate position. Such a structure is difficult to handle at times. The bracing and standing of the corral are required for the containment of horses.

Also, other animals can be contained in a corral. Thus, the corral can also be used for sheep, goats, cattle, or other animals.

Sometimes, the area provided requires various configurations of the portable corral. If the corral can be portable with ease of assembly and disassembly, along with a variety of configurations, great advantages can be obtained. However, these requirements work against each other. Clearly, a device maximizing all of the advantages and minimizing the disadvantages at the same time.

SUMMARY OF THE INVENTION

Among the many objectives of this invention is the provision of an easily transported corral.

A further objective of this invention is the provision of an easily transported corral for horses.

Yet a further objective of this invention is the provision of an easily assembled corral.

A still further objective of this invention is the provision of an easily disassembled corral.

Another objective of this invention is the provision of a corral with an adjustable size.

Yet another objective of this invention is the provision of a corral with a variety of configurations.

Still, another objective of this invention is the provision of a corral, which can be braced.

These and other objectives of the invention (which other objectives become clear by consideration of the specification, claims and drawings as a whole) are met by providing a corral assembled from telescoping panels and fasteners.

BRIEF DESCRIPTION OF THE DRAWINGS

FIG. 6 depicts a perspective collapsed view 122 of portable corral 100 of this invention stored in trailer 110.

FIG. 7 depicts a top, plan view of portable corral 100 of this invention with four corrals.

FIG. 8 depicts a top, plan view of portable corral 100 of this invention with three corrals.

FIG. 14 depicts a side view of the single gate assembly 300 for corral 100 of this invention.

FIG. 15 depicts a perspective view of corral 100 of this invention, utilizing trailer 110.

Throughout the figures of the drawings, where the same part appears in more than one figure of the drawings, the same number is applied thereto.

PREFERRED EMBODIMENTS

The portable corral of this invention has a series of fence sections. Each fence section is preferably formed by a telescoping panel, which has a first female panel and a second male panel, which telescope into each other. In other words, the first female panel receives the second male panel in a female to male relationship. Each fence section may have from one to four or more horizontal tubes. Three tubes are preferred.

The slidable or telescoping panels, used and mounted as fence sections, can be extended as desired in order to adjust the size of the corral. Base receivers support the panels or the fence sections as desired. Fasteners also join adjacent sections together, in order to form the corral into its desired shape.

Additionally, the base receivers can have a plurality of tubular receivers from one to four or more and permit assembling the telescoping panels as structures for a fence structure as desired. The base receivers can receive the base from the posts of the fence sections, in a male or female relationship as desired.

Thus, the horizontal bars of the telescoping panel for the fence structure slidably mount within each other in a male female relationship, while the base of the telescoping panel mounts into the support post in the same male female relationship, order to form the fence structure or corral. These posts permit easy assembly, because it is not required to thoroughly aim each post into its support, or pin the posts together as required in the prior art. Thus, great advantages are obtained thereby, in storage, assembly, disassembly and transportation of the portable corral.

Figure 1:
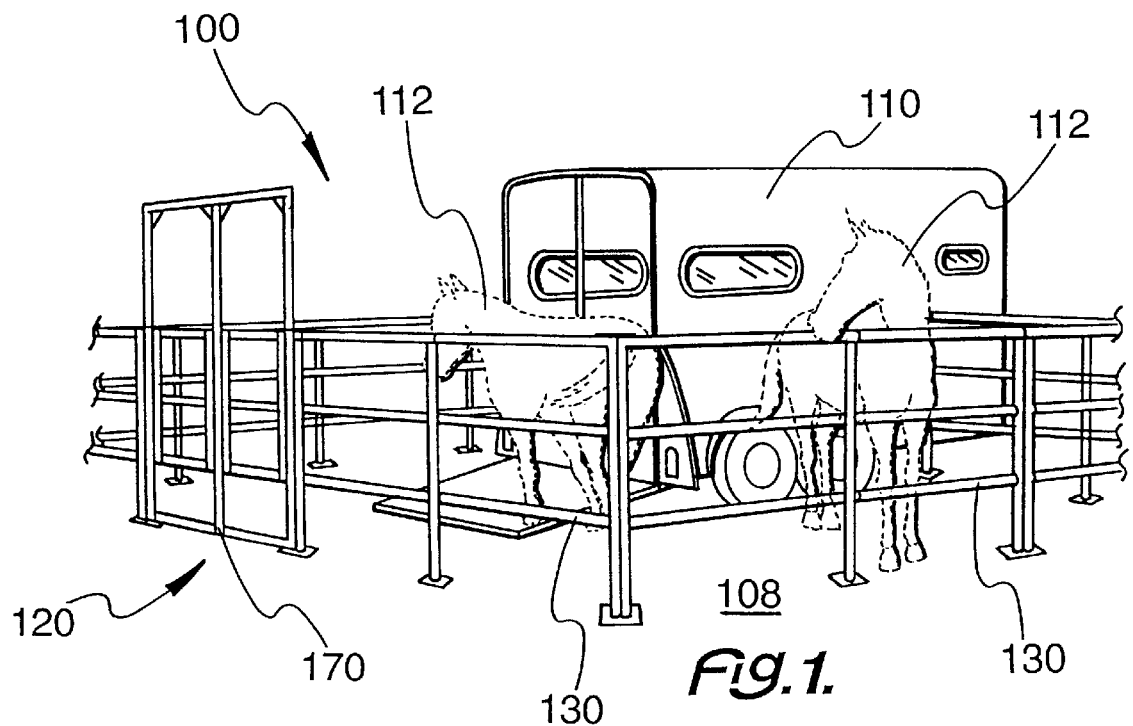
FIG. 1 depicts a perspective view of the portable corral 100 of this invention in a set up position 120.

Referring now to FIG. 1, the portable corral 100 of this invention is in setup position 120 relative to trailer 110 for horse 112. Double gate assembly 170 is shown as mounted in corral 100 and the fence extensions of the first telescoping panel 130 and second telescoping panel 130 are shown as connected with an appropriate fastener.

Figure 2:
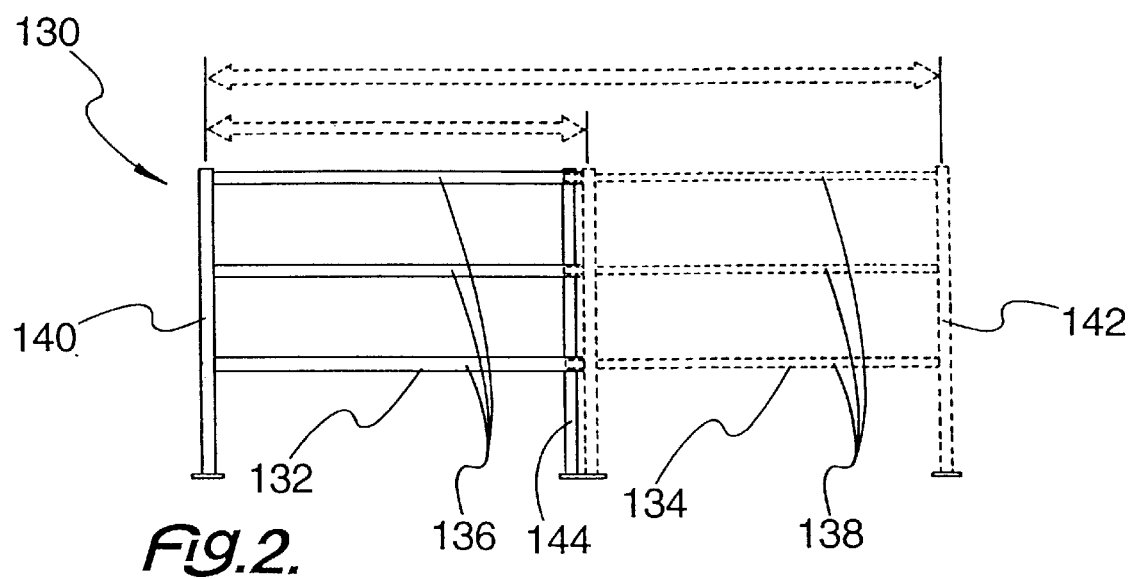
FIG. 2 depicts a side view of telescoping panel 130 for portable corral 100 of this invention.

Adding FIG. 2 to the consideration, telescoping panel 130 is depicted as having a first female panel 132 receiving a second male panel 134. There are three female tubes 136 depicted on the first female panel 132. Each of the three female tubes 136 receive a male tube 138 from second male panel 134. Various fasteners connect one telescoping panel 130 to another in a desired sequence in order to form corral 100.

Telescoping panel 130 has first female panel 132, with the generally parallel and horizontal three female tubes 136 connected to a female vertical pole 140. Likewise, telescoping panel 130 has the second male panel 134, with the generally parallel and horizontal three male tubes 138 connected to a male vertical pole 142. Oppositely disposed from female vertical pole 140, three female tubes 136 may optionally be secured support pole 144.

Support pole 144 provides additional strength to telescoping panel 130, but is not always required. Foot cap 160 may be applied to both support pole 144 and male vertical pole 142, in order to keep telescoping panel 130 in a collapsed position when stored or avoid ground penetrations.

In this fashion, a plurality of telescoping panels 130 can be connected to form corral 100. Likewise, corral 100 can easily be disassembled to transport corral 100. Also, double gate assembly 170 may be inserted as desired in corral 100, by using the appropriate fasteners.

Figure 3:
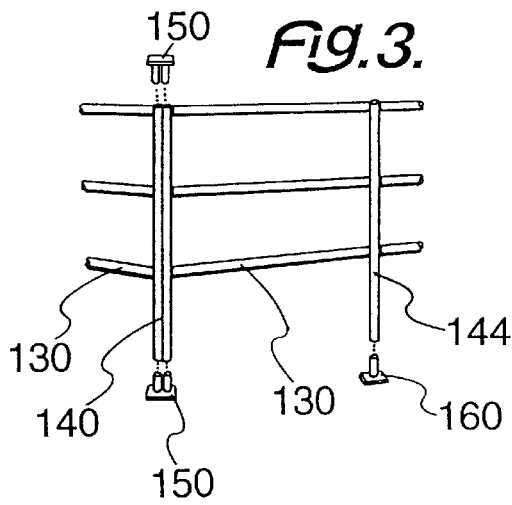
FIG. 3 depicts an exploded, perspective view of telescoping panel 130 adapted to be fastened to a second telescoping panel 130 for portable corral 100 of this invention.
Figure 12:
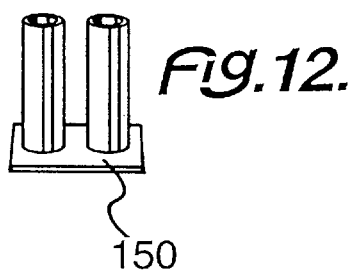
FIG. 12 depicts a perspective view of the coupling end cap 150 for portable corral 100 of this invention.

Adding FIG. 3 and FIG. 12 to the consideration, the coupling end cap 150 permits joining of two telescoping panels 130 and permits an angle therebetween. This angle provides for a corner 140 of the corral 100. Also, the coupling end cap 150 (FIG. 12) permits two or more panels 130 to be connected in substantially a straight line or at an angle by rotating panel 130 in the fastener such as foot cap 160.

Figure 10:
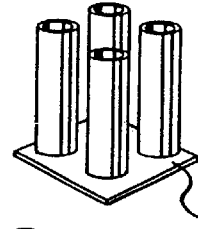
FIG. 10 depicts a perspective view of the four way coupling cap 200 for portable corral 100 of this invention.

With the four-way cap 200 of FIG. 10, the corral 100 may be divided into four corrals by using the appropriate number of telescoping sections 130 and desired fasteners. In this fashion, animals may be separated if desired.

If desired, the other support pole 144 on the telescoping panel 130 of the corral 100 may even have a foot cap 160 on it in order to protect it from penetrating the ground 108 as shown in FIG. 1. With the plurality of telescoping panels 130, both a coupling end cap 150 and foot cap 160 for portable corral 100 may be used along with other fasteners.

Figure 4:
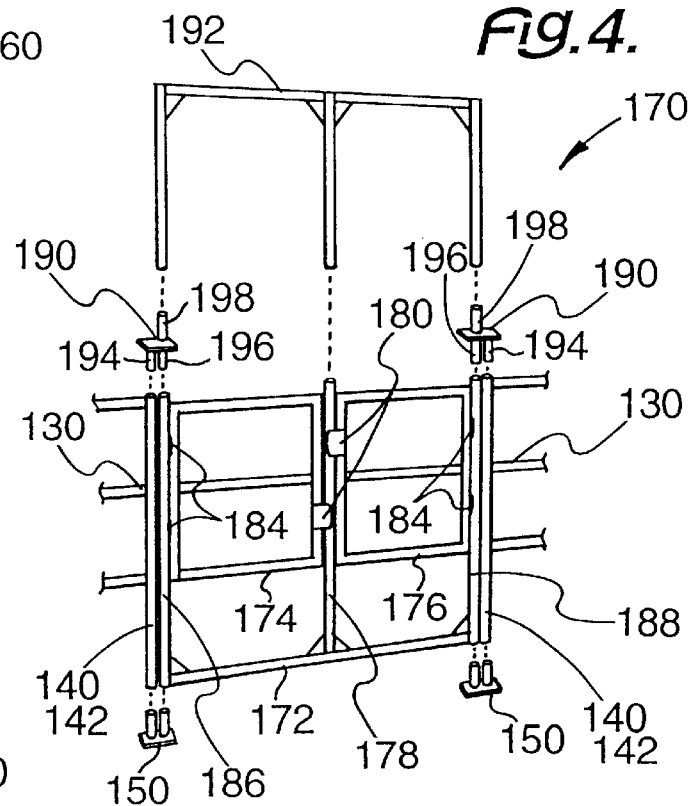
FIG. 4 depicts an exploded, perspective view of telescoping panel 130 in combination with double gate assembly 170 for portable corral 100 of this invention.

Adding FIG. 4 to the consideration, the installation of the gate coupling 190 permits double gate assembly 170 to be inserted in the corral 100. Gate assembly 170 includes a panel frame 172 having a first, hinged, swinging gate 174 and a second, hinged, swinging gate 176 mounted thereon, thereby providing a double for one corral or a single gate for a large version of corral 100.

A stop pole 178 is optionally and centrally located therebetween. With a gate flange 180 rests on the stop pole 178. At the opposing sides from the gate flange 180, a hinge 184 secures the swinging gates 174 and 176 to the first hinge post 186 and the second hinge post 188, respectively.

The gate assembly 170 is secured at the hinge post 186 and 188 to a telescoping panel 130 by gate coupling 190. A top gate frame 192 may be placed over the gate coupling 190. Gate coupling 190 has sectional lower tube 194 to receive telescoping panel 130 and gate receiving lower tube 196 for securing the double gate assembly 170 between two telescoping sections 130, while forming corral 100.

The fence panels 130 have either vertical pole 140 or vertical pole 142 at either end, which can butt up against first hinge post 186 or second hinge post 188 and be fastened thereto. Such fastening occurs at top end with gate coupling 190 and at the bottom end with coupling end cap 150. One top tube 198 permits the gate top 190 to be secured on either side thereof to the gate assembly 170. Telescoping panel 130 is adjusted in length, in order to provide for placement of gate assembly 170.

Figure 5:
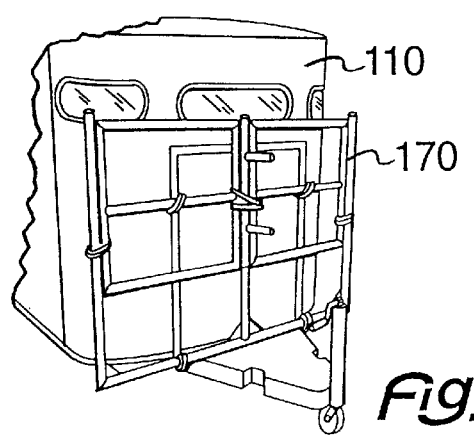
FIG. 5 depicts a perspective view of double gate assembly 170 for portable corral 100 of this invention stored on trailer 110.

As is shown in FIG. 5, the gate assembly 170 may be stored on the front of trailer 110. Also shown in FIG. 6, a collapsed version 122 of the portable corral 100 is shown as collapsed and placed in the trailer 110.

A divided corral 100, as shown in FIG. 7, depicts telescoping panel 130 in combination with a several telescoping panels 130, a four-way coupling end cap 200 of FIG. 10 for portable corral 100 of this invention. In this fashion, the corral 100 may have a four compartment structure 102.

With the four-way coupling end cap 200 of FIG. 10, the corral 100 may be divided into four corrals or a four compartment structure 102 by using the appropriate number of telescoping panels 130 with four way coupling end cap 200 and other fasteners. In this fashion, animals may be separated if desired, shown in FIG. 7.

Figure 9:
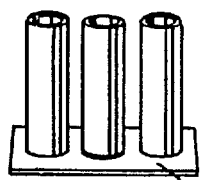
FIG. 9 depicts a perspective view of the triple cap 204 for portable corral 100 of this invention.

With FIG. 8 and FIG. 9, triple cap 204 has a three tubes assembly thereon. Such structure permits a triangulated arrangement or three compartment structure 104 from telescoping sections 130. It is also possible to use fixed section (not shown) with or without telescoping sections 130. A fixed section is similar in appearance to telescoping section 130, but has a fixed length. Clearly, telescoping sections 130 are preferred.

Figure 11:
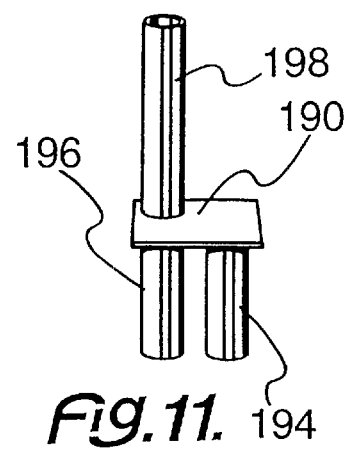
FIG. 11 depicts a perspective view of the gate coupling 190 for portable corral 100 of this invention.

In FIG. 11, gate coupling 190 provides for installation of gate assembly 170 in corral 100. Gate coupling 190 has two lower tubes in the form of section lower tube 194 and gate receiving tube 196, and one upper tube 198. Lower tubes 194 and 196, and upper tube 198 may be in a male to female or female to male relationship with other parts of corral 100. The female to male relationship is preferred in this and all other fasteners. Gate assembly 170 may be inserted in corral 100 with this structure.

Figure 13:
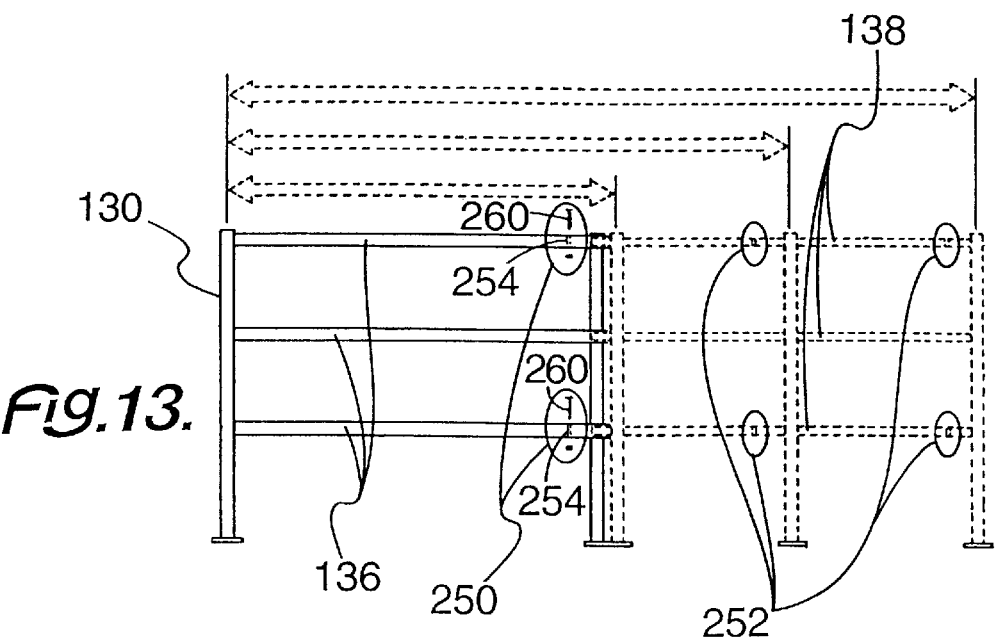
FIG. 13 depicts a side view of telescoping panel 130 with locking assembly 250 for portable corral 100 of this invention.

In FIG. 13, telescoping panel 130 includes locking assembly 250 for portable corral 100. Locking assembly 250 permits telescoping panel 130 secured at a point permitting insertion of either double gate assembly 170 or single gate assembly 300. Locking assembly 250 includes an aligned pair of male apertures 252 in up to three male tubes 138. Also within up to three female tubes 136 may be an aligned pair of female apertures 254.

Each pair of female apertures 254 may be aligned with a pair of male apertures 252 and receive a locking mechanism such as a carriage bolt 260. With the carriage bolt 260, telescoping panel 130 may be locked for storage or permit single gate assembly 300 or double gate assembly 170 to be inserted therein.

In FIG. 14, single gate assembly 300 for corral 100 has a frame 302 with hinged side 304 and swing side 306. On swing side 306 is latch 308 for single gate 310. Over frame 302 is slidably mounted top support 312, in male to female relationship or a reverse thereof. Gate coupling 190 can support single gate assembly 300 in corral 100.

FIG. 15 depicts corral 100, uses trailer 114, and forms a first separate section 352 and a second separate section 354, with a series of telescoping panels 130 and dual gate assembly 170. This structure permits separation of two animals, and grants each of the animals access to trailer 114 for shade. Various couplings of the type above-described are used for this purpose.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A corral capable of being easily transported comprising:
   (a) at least a first telescoping panel, a second telescoping panel and a third telescoping panel combining to form the corral;
   (b) at least a first fastener releasably securing the first telescoping panel to the second telescoping panel;
   (c) at least a second fastener releasably securing the second telescoping panel to the third telescoping panel;
   (d) at least a third fastener releasably securing the first telescoping panel to the third telescoping panel;
   (e) the first telescoping panel, the second telescoping panel and the third telescoping panel combining to permit the corral to have an adjustable size;
   (f) at least one additional telescoping panel being connected to form the corral;
   (g) at least one base receiver supporting the first telescoping panel, the second telescoping panel, the third telescoping panel and the at least one additional telescoping panel;
   (h) the base receiver having a plurality of tubular receivers thereon; and
   (i) the plurality of tubular receivers being selected from the group consisting two tubular receivers, three tubular receivers and four tubular receivers in order to permit the corral to be formed.

2. The corral of claim 1 further comprising:
   (a) a gate assembly being positioned in the corral;
   (b) at least one gate cap securing the gate assembly in the corral;
   (c) the first telescoping panel, the second telescoping panel, the third telescoping panel and the at least one additional telescoping panel being similar in structure; and
   (d) the gate assembly being positioned by adjusting a length of at least one member selected from the group consisting of the first telescoping panel, the second telescoping panel, the third telescoping panel and the at least one additional telescoping panel.

3. The corral of claim 2 further comprising:
   (a) a double gate assembly being positioned in the corral;
   (b) at least one gate cap securing the double gate assembly in the corral; and
   (c) the double gate assembly being positioned by adjusting a length of at least one member selected from the group consisting of the first telescoping panel, the second telescoping panel, the third telescoping panel and the at least one additional telescoping panel.

4. The corral of claim 3 further comprising:
   (a) the at least one gate cap having a first lower tube and a second lower tube;
   (b) the double gate assembly having a panel frame;
   (c) the first lower tube fitting with the panel frame; and
   (d) the second lower tube fitting with the at least one member selected from the group consisting of the first telescoping panel, the second telescoping panel, the third telescoping panel and the at least one additional telescoping panel.

5. The corral of claim 4 further comprising:
   (a) the at least one gate cap having an upper tube;
   (b) the at least one gate cap being two gate caps providing two upper tubes; and
   (c) a gate top for the gate assembly connecting to each of the two upper tubes at opposing ends thereof.

6. The corral of claim 5 further comprising:
   (a) the gate frame including a first gate and a second gate;
   (b) a first hinge assembly movably securing the first gate to the gate frame;
   (c) a second hinge assembly movably securing the second gate to the gate frame; and
   (d) the first hinge being oppositely disposed from the second hinge assembly movably securing the second gate to the gate frame.

7. The corral of claim 6 further comprising:
   (a) the gate frame having a stop pole between the first gate and the second gate;
   (b) the first gate having a first gate flange adapted to rest on the stop pole;
   (c) the second gate having a second gate flange adapted to rest on the stop pole; and
   (d) a hinge assembly securing the first gate and the second gate to and the double gate frame.

8. The corral of claim 7 further comprising:
   (a) the telescoping panel having a male section and a female section;
   (b) the male section having horizontal three male tubes connected to a male vertical pole;
   (c) the female section having horizontal three female tubes connected to a female vertical pole; and
   (d) each of the horizontal three male tubes being adapted to receive one of the three female tubes in order to form the telescoping panel.

9. The corral of claim 2 further comprising:
   (a) the telescoping panel having male section and a female section;
   (b) the female section receiving the male section; and
   (c) the female section having a female vertical pole at a first side thereof;
   (d) the female section having a female support pole at a second side thereof;
   (e) the first side being oppositely disposed from the second side thereof; and (f) the male section being received by the female section at the bracing pole.

10. The corral of claim 9 further comprising:
    (a) a foot cap being applied to at least one member selected from the group consisting of the male vertical pole, the female vertical pole and the support pole; and
    (b) a coupling cap joining the first telescoping panel to the second telescoping panel; and
    (c) the coupling cap permitting the first telescoping panel to be joined to the second telescoping panel at an angle.

11. The corral of claim 2 further comprising:
    (a) a gate cap securing a single gate assembly in the corral;
    (b) the single gate assembly having a single frame;
    (c) the single frame having a hinged side and a swing side;
    (d) a gate being hingedly secured to the hinged side;
    (e) at least one hinge for the gate being mounted on the hinged side;
    (f) a latch for the gate being mounted on the swing side; and
    (g) the at least one hinge being adapted to cooperate with latch in order to secure the gate.

12. The corral of claim 2 further comprising:
    (a) a trailer cooperating with the first telescoping panel, the second telescoping panel, the third telescoping panel and the at least one additional telescoping panel in order to form the corral; and
    (b) the trailer providing shelter for an animal in cooperation with the corral.

13. The corral of claim 12 further comprising the at least one additional telescoping panel being two to ten panels.

14. The corral of claim 2 further comprising the at least one additional telescoping panel being two to ten panels.

15. The corral of claim 2 further comprising:
    (a) the telescoping panel including a locking assembly;
    (b) the locking assembly permitting insertion of a gate gate assembly in the corral; and
    (c) the locking assembly assisting storage of the telescoping panel for the corral when the corral is disassembled.

16. The corral of claim 15 further comprising:
    (a) the locking assembly including an aligned pair of male apertures in at least one male tube;
    (b) the locking assembly including an aligned pair of female apertures in at least one female tube; and
    (c) the aligned pair of male apertures being adapted to with the aligned pair of female apertures in order to receive a fastening device.

17. A corral capable of being easily transported comprising:
    (a) at least a first telescoping panel, a second telescoping panel and a third telescoping panel combining to form the corral;
    (b) at least a first fastener releasably securing the first telescoping panel to the second telescoping panel;
    (c) at least a second fastener releasably securing the second telescoping panel to the third telescoping panel;
    (d) at least a third fastener releasably securing the first telescoping panel to the third telescoping panel;
    (e) the first telescoping panel, the second telescoping panel and the third telescoping panel combining to permit the corral to have an adjustable size;
    (f) at least one additional telescoping panel being connected to form the corral;
    (g) at least one base receiver supporting the first telescoping panel, the second telescoping panel, the third telescoping panel and the at least one additional telescoping panel;
    (h) the base receiver having a plurality of tubular receivers thereon;
    (i) the plurality of tubular receivers being selected from the group consisting two tubular receivers, three tubular receivers and four tubular receivers in order to permit the corral to be formed;
    (j) a gate assembly being positioned in the corral;
    (k) at least one gate cap securing the gate assembly in the corral;
    (l) the first telescoping panel, the second telescoping panel, the third telescoping panel and the at least one additional telescoping panel being similar in structure;
    (m) the gate assembly being positioned by adjusting a length of at least one member selected from the group consisting of the first telescoping panel, the second telescoping panel, the third telescoping panel and the at a second lower tube;
    (n) the telescoping panel having a male section and a female section;
    (o) the male section having horizontal three male tubes connected to a male vertical pole;
    (p) the female section having horizontal three female tubes connected to a female vertical pole; and
    (q) each of the horizontal three male tubes being adapted to receive one of the three female tubes in order to form the telescoping panel.

18. A method of setting up and taking down a portable corral, the corral being easily transportable, comprising:
    (a) providing a set of telescoping panels at least a first telescoping panel, a second telescoping panel, a third telescoping panel combining to form the corral, and at least one additional telescoping panel;
    (b) providing a series of slidable fasteners for sequentially securing the set of telescoping panels to form the corral;
    (c) securing a gate assembly in the corral; and
    (b) providing at least one base receiver to support the first telescoping panel, the second telescoping panel, the third telescoping panel and the at least one additional telescoping panel.

* * * * *